(12) United States Patent
Lee

(10) Patent No.: US 6,536,902 B2
(45) Date of Patent: Mar. 25, 2003

(54) PROJECTOR

(75) Inventor: Seung Gyu Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/026,527

(22) Filed: Dec. 27, 2001

(65) Prior Publication Data

US 2002/0085179 A1 Jul. 4, 2002

(30) Foreign Application Priority Data

Dec. 28, 2000 (KR) .................................... 2000-0084717

(51) Int. Cl.$^7$ ............................................... G03B 21/14
(52) U.S. Cl. ................. 353/20; 353/31; 349/9
(58) Field of Search ........................... 353/20, 31, 33, 353/34, 37, 38; 349/5, 7, 8, 9

(56) References Cited

U.S. PATENT DOCUMENTS

| | | | | |
|---|---|---|---|---|
| 5,517,340 A | * | 5/1996 | Doany et al. ................ 349/5 |
| 5,552,840 A | * | 9/1996 | Ishii et al. .................. 348/751 |
| 5,863,125 A | * | 1/1999 | Doany ........................ 353/84 |
| 5,884,991 A | * | 3/1999 | Levis et al. ................. 353/122 |
| 5,984,478 A | * | 11/1999 | Doany et al. ................ 353/84 |
| 6,005,722 A | * | 12/1999 | Butterworth et al. ........ 359/712 |
| 6,266,105 B1 | * | 7/2001 | Gleckman ................... 348/743 |
| 6,343,862 B1 | * | 2/2002 | Sawai et al. ................. 353/1 |
| 6,343,864 B1 | * | 2/2002 | Tajiri ........................... 353/20 |

* cited by examiner

Primary Examiner—William Dowling
(74) Attorney, Agent, or Firm—Fleshner & Kim, LLP

(57) ABSTRACT

Projector is provided, including a light source, a color wheel for splitting two, or more than two color beams from the beam from the light source, a rod lens for making a distribution of the color beam from the color wheel uniform, a polarization beam converter for converting the color beams into particular polarization beams, an optical system for focusing the color beams converted into the particular polarization beams, a color selecting plate for converting particular polarization color beams in the focused color beams, two displays for reflecting the color beams from the color selecting plate differently according to a video signal to form picture beams, a polarization beam sprite prism for supplying a particular color beam having polarization converted at the color selecting plate to one of the displays, and color beams of other colors to the other display, and a projection lens for enlarging, and projecting the picture beams.

32 Claims, 11 Drawing Sheets

PROJECTOR

This application claims the benefit of the Korean Application No. P2000-84717 filed on Dec. 28, 2000, which is hereby incorporated by reference.

BACKGROUND OF THE INVENTION

1. Field of the Invention

The present invention relates to a projector.

2. Background of the Related Art

The projector enlarges, and projects a small picture on a small display inside of the projector by using a lens system to a large sized screen, to display a large sized picture. There are a front projection type in which the picture is displayed on a front face of the screen, and a rear projection type in which the picture is displayed on a rear face of the screen. As a typical one of the latter, there is the projection television. As the small display in the projector that displays the small picture, LCD (Liquid Crystal Display) and DMD (Digital Micromirror Device), and the like are employed. The LCD is provided with a polarization beam converter for displaying the picture by using a linearly polarized light. FIG. 1 illustrates a related art projector.

Referring to FIG. 1, the related art projector is provided with a lamp 1 for emitting a beam of light, a parabolic reflector 2 for reflecting the beam to forward of the lamp 1, a polarization beam converter for transmitting an 'S' wave, and converting 'P' wave into 'S' wave and transmitting the converted 'S' wave among the beam from the parabolic reflector 2, first to third illumination lenses 10, 12, and 14 for focusing the beam polarized into a particular polarized light at the polarization beam converter, a color switch 16 for transmitting only a particular beam among the beams from the third illumination lens 14, a polarization beam sprite prism 18 for supplying a color light from the color switch 16 to a display 22, and the beam reflected at the display 22 to a projection lens 20, a display 22 for displaying a picture by reflecting the color light from the polarization beam sprite prism 18 in response to a video signal, and a projection lens 20 for enlarging the beam of the picture from the display 22, and projecting to a distance.

The beam of light from the lamp 1 is directed to the polarization beam converter by the parabolic reflector 2. The polarization beam converter transmits the S wave, and converts and transmits P wave among the beam from the parabolic reflector 2.

To do this, the polarization beam converter is provided with a first lens array 4, a second lens array 6, and a polarization beam sprite array 8 facing a light output surface of the second lens array 6. The first lens array 4, or the second lens array 6 focuses the beam of light including the P wave and the S wave to a plurality of focusing points.

To do this, the first, or second lens array 4, or 6 has a matrix of a plurality of lenses. The polarization beam sprite array 8 transmits 'S' wave, and converts the P wave into the S wave, and transmits the converted S wave, both from the second lens array 6. To do this, the polarization beam sprite array 8 provided with polarization beam split planes 24 and reflection planes 26, and half wave plates 28 attached to light output surfaces of the polarization beam split planes 24 as shown in FIG. 2.

The polarization beam split plane 24 transmits only the P wave and reflects the S wave among the white light from the second lens array 6. The P wave transmitted through the polarization beam split plane is converted into an S wave by the half wave plate 28. On the other hand, the S wave reflected at the polarization beam split plane 24 is reflected at the reflection plane 26.

That is, the entire beam of light including the P wave and the S wave passed through the polarization beam sprite array 8 is converted into the S wave. The beam of light converted into the S wave at the polarization beam converter passes through the first to third illumination lenses 10, 12, and 14 in succession. The first to third illumination lenses 10, 12, and 14 focus the beam of light converted into the S wave onto the color switch 16.

The color switch 16 splits red, green, and blue colors in succession so that one display cell has red, green, and blue colors. To do this, the color switch 16 filters a particular color light according to a variation of a voltage signal applied. In this instance, the color light passed through the color switch 16 is converted into the P wave from the S wave, and directed to the polarization beam sprite prism 18. The P wave color light from the color switch 16 to the polarization beam sprite prism 18 transmits a split plane 30, and directed to the display 22.

The display 22 reflects the P wave color light transmitted through the polarization beam sprite prism 18 according to a video signal, to produce a picture beam with picture information. In this instance, as shown in FIG. 3A, the P wave color light reflected at the display 22 is converted into the S wave when no electric signal is applied thereto.

The picture beam converted into the S wave at the display 22 is reflected at the split plane 30 of the polarization beam sprite prism 18, and directed to the projection lens 20. To do this, the split plane 30 of the polarization beam sprite prism 18 transmits the P wave, and reflects the S wave as shown in FIGS. 4A and 4B. Accordingly, the polarization beam sprite prism 18 transmits the P wave from the color switch 16, and reflects the S wave from the display 22 toward the projection lens 20. The projection lens 20 enlarges the picture beam from the polarization beam sprite prism 18, and projects to a screen at a distance.

In the meantime, as shown in FIG. 3B, the display 22 transmits the P wave color light from the polarization beam sprite prism 18 is if there is an electrical signal applied thereto. Therefore, no beam of light is incident on the projection lens 20 when there is the electrical signal applied to the display 22. The projection lens 20 enlarges the picture beam from the polarization beam sprite prism 18, and projects onto a screen at a distance therefrom.

However, the color switch 16 for splitting the color light from the beam of light in the related art projector has a poor light efficiency caused by poor light transmission performance. A color wheel may be employed in place of the color switch 16.

However, for employing the color wheel in the related art projector, an optical system that converges the beam of light and an optical system that diverges the beam of light are required. Moreover, the polarization beam converter in the related art projector requires lens arrays 4, and 6 each having a plurality of lenses.

However, the lens array 4 or 6 with the plurality of lenses has optical losses between the lenses. A number of the lenses in the lens array 4 or 6 may be reduced for reducing the optical loss, but that increases a thickness of the polarization array to push the cost up. Moreover, since an optical conversion efficiency is significantly dependent on an alignment of the lens arrays 4, and 6, assembly of the projector requires much time.

In addition to this, the related art projector has the lamp with the parabolic reflector 2 for providing parallel lights to the polarization beam converter. The lamp with the parabolic reflector 2 has an optical efficiency poorer than a lamp 34 with an elliptic reflector 32 as shown in FIG. 5.

It will be explained in detail assuming that a diameter of the parabolic reflector 2 is Dp and a diameter of the elliptic reflector is De. The lamp 1 with the parabolic reflector 2 directs the beam of light forward in parallel, i.e., the parabolic reflector 2 is required to have a slope for directing the beam from the lamp 1 forward in parallel.

On the other hand, the lamp 34 with an elliptic reflector 32 directs the beam of light such that the beam is focused at a plane in front of the lamp 34. Accordingly, the elliptic reflector 32 is required to have a slope greater than the parabolic reflector 3 so that the beam from the lamp 34 is focused on the plane in front of the lamp 34. That is, because the lamp 34 with the elliptic reflector 32 can reflect more beam, the lamp 34 with the elliptic reflector 32 has an optical efficiency higher than the lamp 1 with the parabolic reflector 2.

If the lamp 34 with the elliptic reflector 32 and the lamp 1 with the parabolic reflector 2 have the same optical efficiency, the diameter of the elliptic reflector 32 can be made smaller than the parabolic reflector 2, to reduce a size of the elliptic reflector 32. However, since the related art polarization beam converter requires a parallel light, the lamp 34 with the elliptic reflector 32 can not be employed.

Therefore, the related art projector has a limitation in fabricating a thinner projector. Moreover, because the related art projector splits red, green, and blue lights from the beam of light, a quantity of light only in a range of ⅓ can be used. For increasing such a lack of quantity of light, though it is required to make a waveband of the light greater, the greater waveband makes a purity of a color poor.

Moreover, it can be known from a spectrum distribution of a light source of the related art projector that a red color lacks in quantity, substantially. Nevertheless, the related art projector has no means to remedy the lack of particular light, particularly, the red light.

SUMMARY OF THE INVENTION

Accordingly, the present invention is directed to a projector that substantially obviates one or more of the problems due to limitations and disadvantages of the related art.

An object of the present invention is to provide a projector which can improve a color purity and an optical efficiency.

Another object of the present invention is to provide a projector which permits fabrication of a thin projector.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the projector includes a light source, a color wheel for splitting two, or more than two color beams from the beam from the light source, a rod lens for making a distribution of the color beam from the color wheel uniform, a polarization beam converter for converting the color beams into particular polarization beams, an optical system for focusing the color beams converted into the particular polarization beams, a color selecting plate for converting particular polarization color beams in the focused color beams, a first display and a second display for reflecting the color beams from the color selecting plate according to a video signal to form different picture beams, a polarization beam sprite prism for supplying a particular color beam having polarization converted at the color selecting plate to the first display, and color beams of other colors to the second display, and a projection lens for enlarging, and projecting the picture beams.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings FIGS. 6–13.

Figure 6:
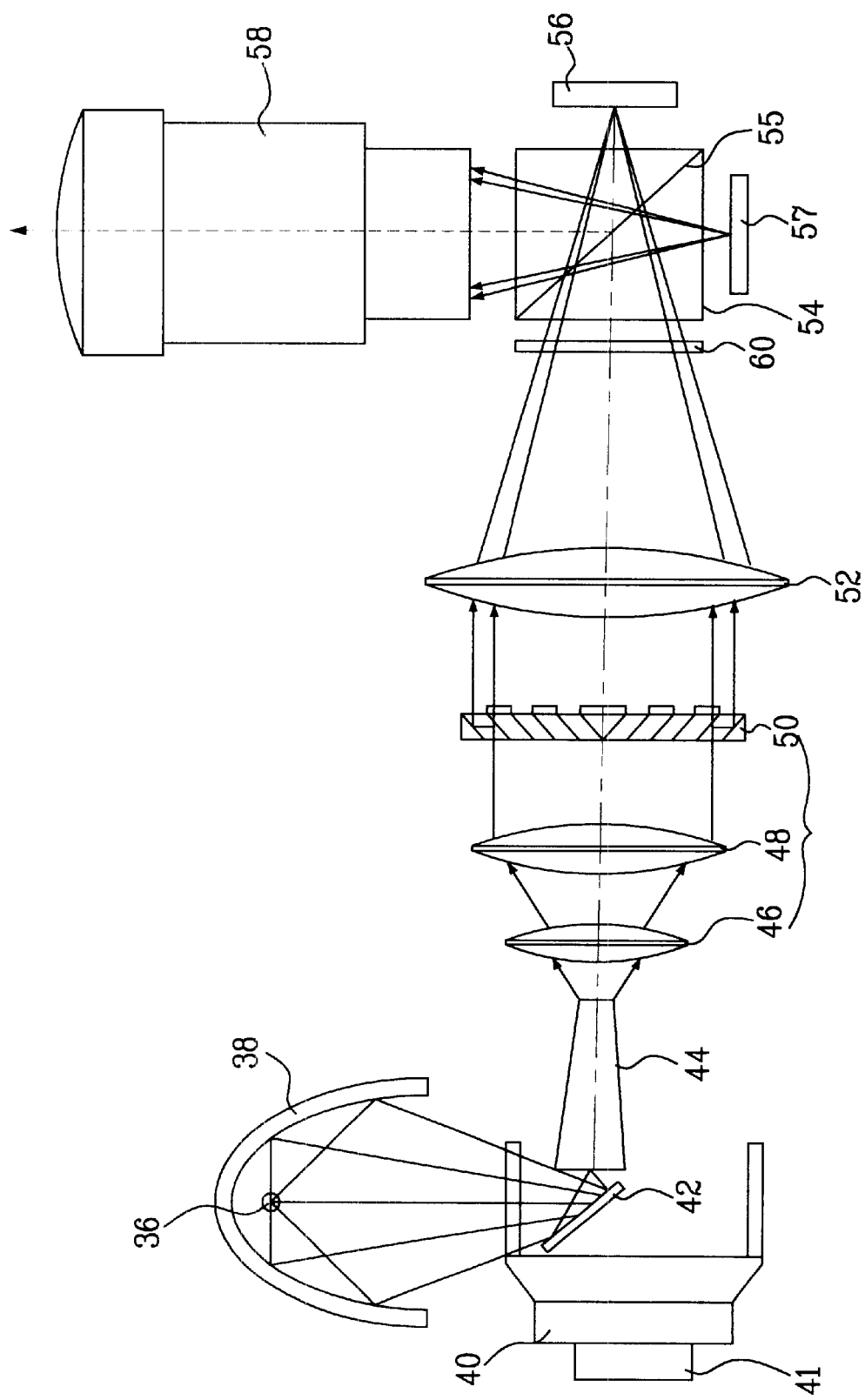
FIG. 6 illustrates a diagram of a projector in accordance with a first preferred embodiment of the present invention.

FIG. 6 illustrates a diagram of a projector in accordance with a first preferred embodiment of the present invention.

Referring to FIG. 6, the projector in accordance with a first preferred embodiment of the present invention includes a lamp 36 for emitting a beam of light, an elliptic reflector 38 for reflecting the beam to forward of the lamp 36, a cylindrical color wheel 40 for transmitting a particular color beam among the beam of light, a mirror 42 for deflecting a path of the color beam passed through the cylindrical color wheel 40, a rod lens 44 for making a distribution of the color beam from the mirror uniform, a polarization beam converter for converting the color beam from the rod lens 44 into a particular polarization beam, a first illumination lens 52 for focusing the color beam converted into the particular polarization beam at the polarization beam converter, a color selecting plate 60 for converting a polarization beam component of a color desired to put emphasis among the colors included in color beams from the third illumination lens 52, a polarization beam sprite prism 54 for supplying a color beam having a polarization beam component converted at the color selecting plate 60 to a first display 56, and a color beam having no converted polarization beam component to a second display 57.

Then, the first display 56 and the second display 57 reflect the color beams supplied from the polarization beam sprite prism 54 according to a video signal, to display a picture.

In the meantime, the projector includes a projection lens 58 for enlarging a beam of the picture from the first display 56 and the second display 57, and projecting onto a screen at a distance.

The operation of the projector of the present invention will be explained in detail.

The beam of light from the lamp 36 is focused to the cylindrical color wheel 40 by the elliptical reflector 38. The cylindrical color wheel 40 transmits color beams of yellow (R+G) and magenta (R+B) in succession as the cylindrical color wheel 40 is rotated by a driving force from a motor 41.

Figure 7:
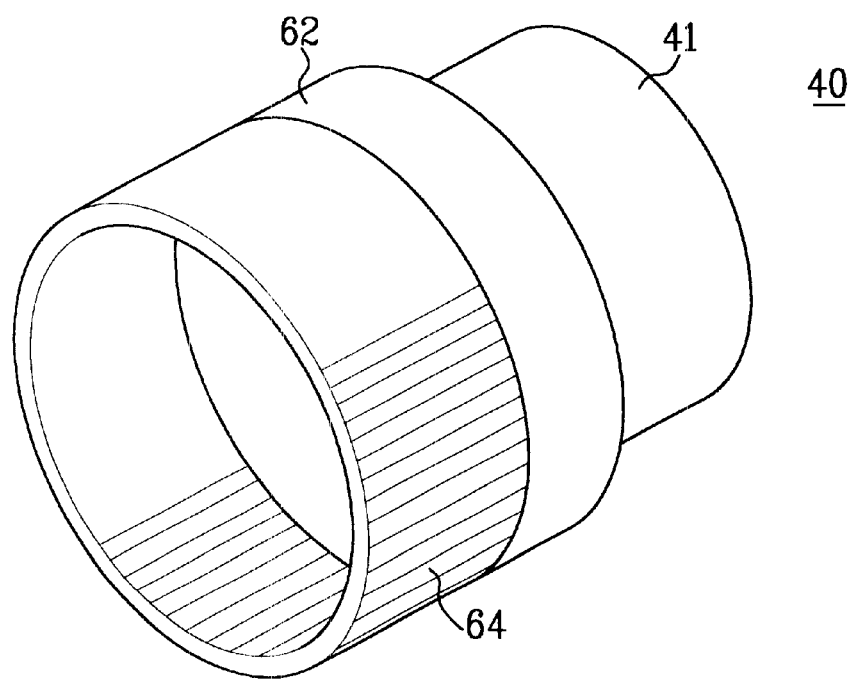
FIG. 7 illustrates a diagram of a cylindrical color wheel in the projector in FIG. 6.

Referring to FIG. 7, to do this, the cylindrical color wheel 40 has a yellow color filter 62 and a magenta color filter 64. The yellow color filter 62 transmits only yellow color among the beam of light incident thereto as the yellow color filter 62 is rotated by the driving force from the motor 41. On the other hand, the magenta color filter 64 transmits only magenta color among the beam of light incident thereto as the magenta color filter 64 is rotated by the driving force from the motor 41.

The beam having a color split at the cylindrical color wheel 40 is totally reflected at the mirror 42, and directed to the rod lens 44. The rod lens 44 makes the beam uniform so that the beam is distributed on the screen, uniformly. That is, a distribution of the beam entered into the rod lens 44 is made uniform by total reflection in the rod lens 44.

In the meantime, the polarization beam converter converts the beam from the rod lens 44 into a particular polarization beam, and transmits the particular polarization beam. To do this, the polarization beam converter includes a second illumination lens 46, and a third illumination lens 48 for focusing the beam from the rod lens 44 at a particular location, and a polarization beam sprite array 50 facing an optical output surface of the third illumination lens 48.

Figure 8:
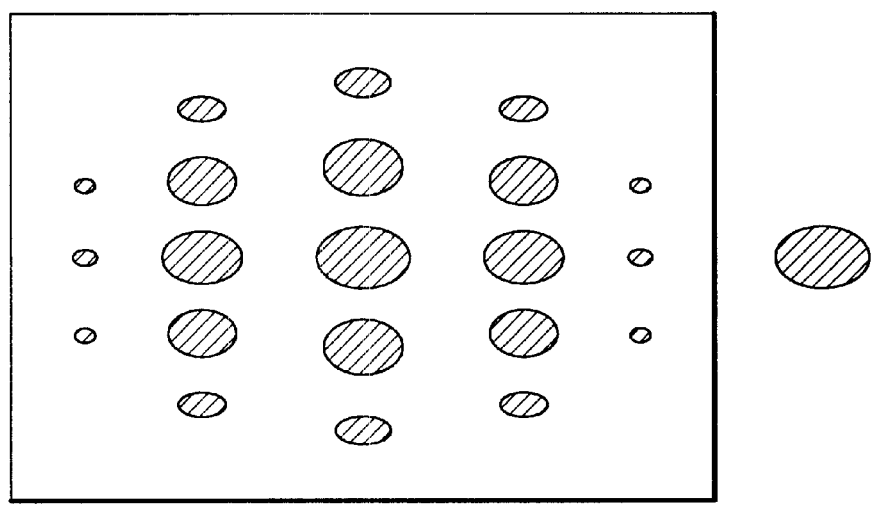
FIG. 8 illustrates a diagram of a distribution of a light focused by the illumination lenses in the projector in FIG. 6.

Referring to FIG. 8, the second illumination lens 46 and the third illumination lens 48 focus the beam from the rod lens 44 onto a plurality of dots. In order to focus the beam onto the plurality of dots by the second illumination lens 46 and the third illumination lens 48, an area of the optical output surface of the rod lens 44 is required to be equal to, or smaller than an area of an optical input surface as expressed in the following inequality (1).

$$\text{An area of an optical input surface} \geq \text{an area of an optical output surface} \quad (1)$$

Figure 1:
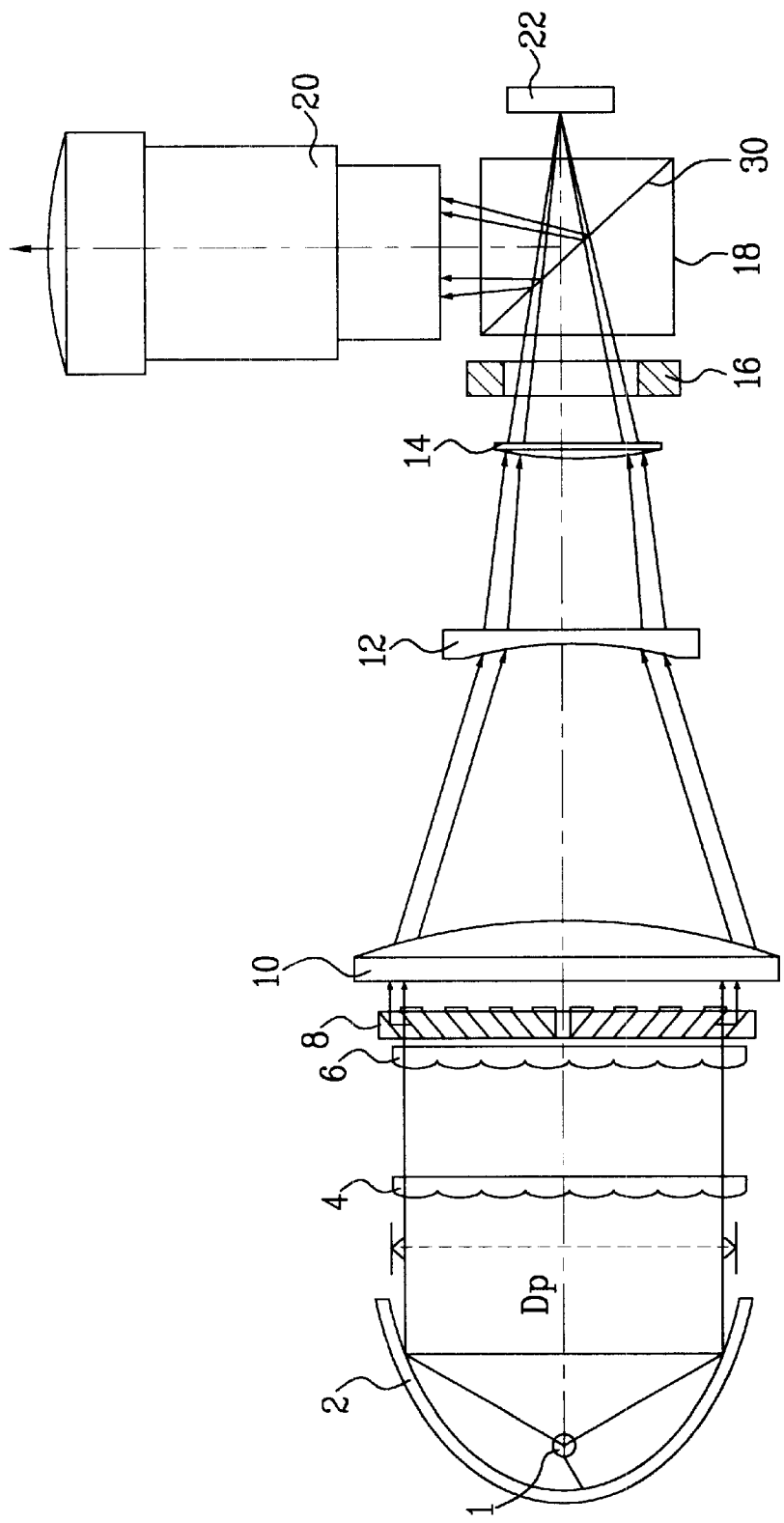
FIG. 1 illustrates a diagram of a related art projector.
Figure 2:
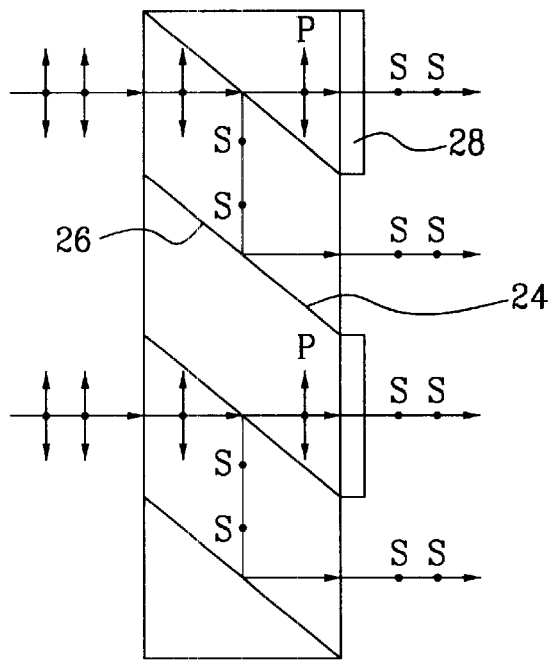
FIG. 2 illustrates a diagram showing operation of the polarization beam sprite array in the projector in FIG. 1.
Figure 3A:
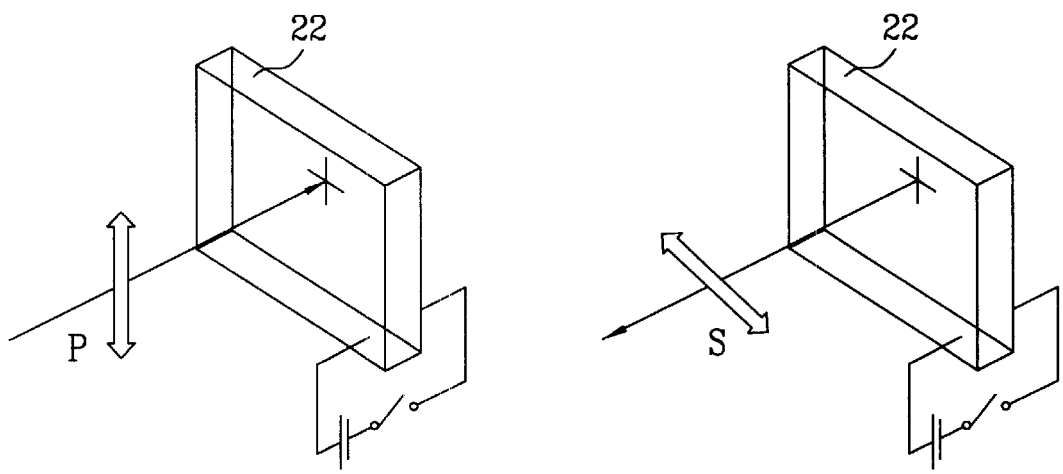
FIGS. 3A and 3B illustrate diagrams showing operation of the projector in FIG. 1.
Figure 3B:
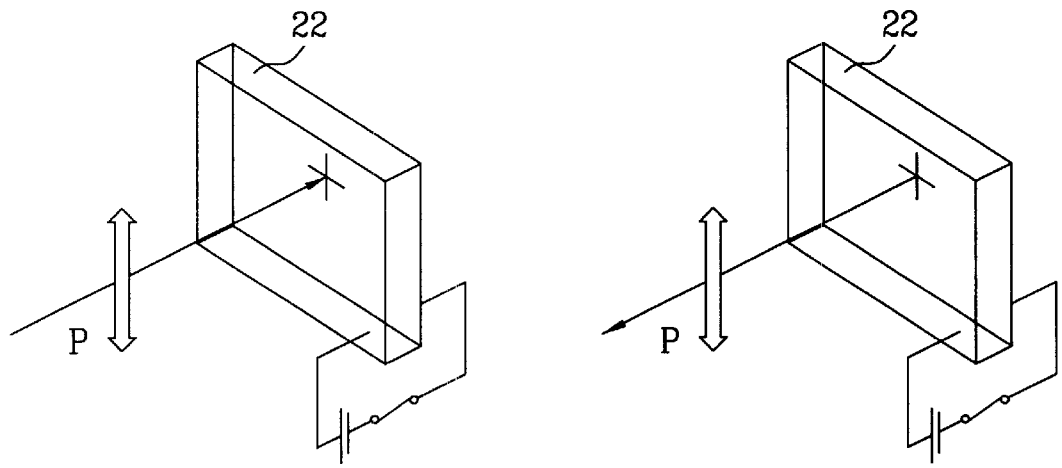
Figure 4A:
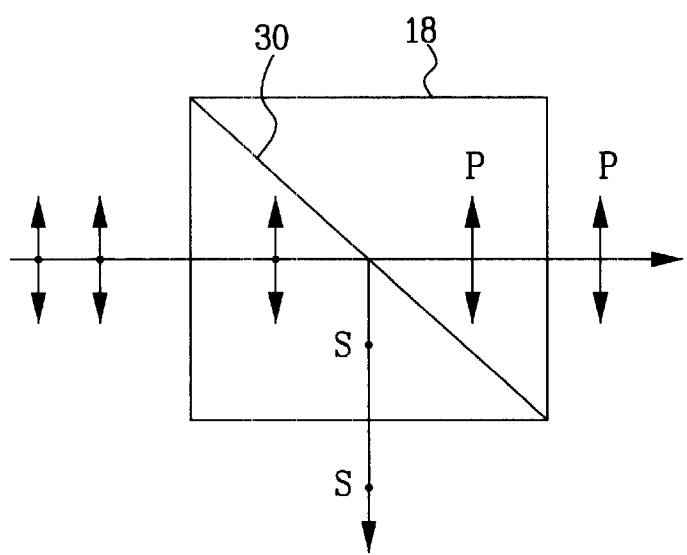
FIGS. 4A and 4B illustrate diagrams showing operation of the polarization beam sprite prism in the projector in FIG. 1.
Figure 4B:
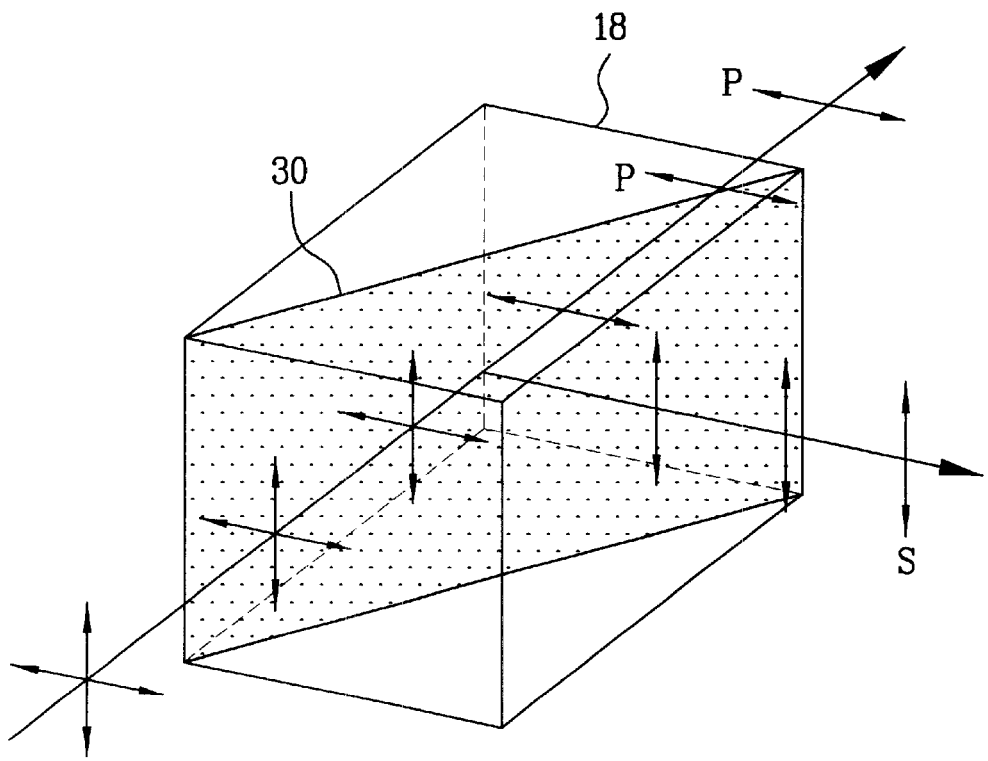
Figure 5:
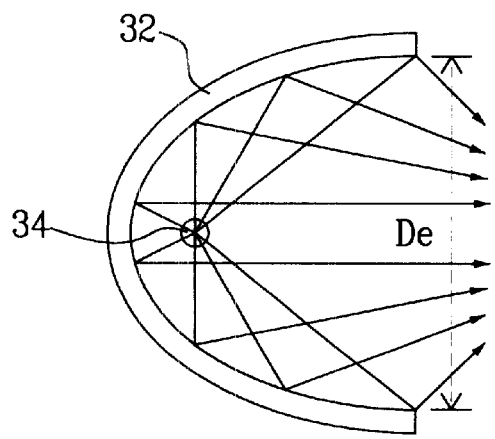
FIG. 5 illustrates a diagram of a lamp with a parabolic reflector.

When the area of the optical output surface of the rod lens 44 is smaller than the area of the optical input surface, a degree of beam split is improved. The beam focused onto the plurality of focused dots by the second illumination lens 46 and the third illumination lens 48 is directed to the polarization beam sprite array 50. The polarization beam sprite array 50 converts the beam from the third illumination lens 48 into a particular polarization beam, and forwards. The polarization beam sprite array 50 converts polarization of the beam including a P wave and an S wave into the S wave as shown in FIG. 2.

Figure 9:
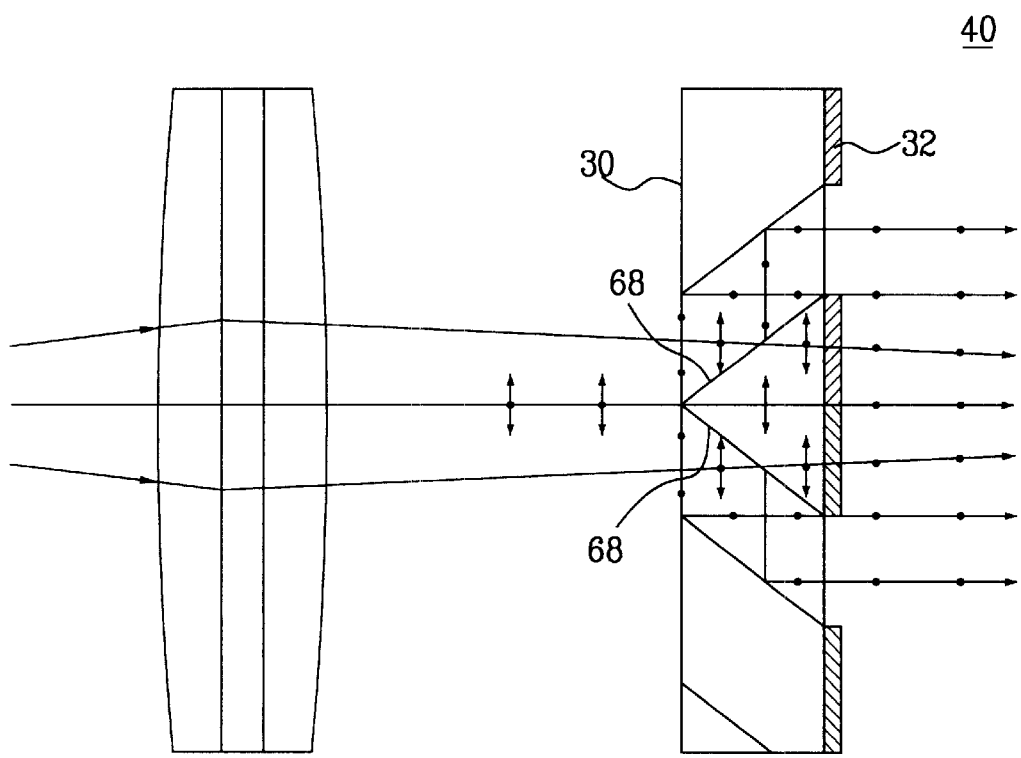
FIG. 9 illustrates a diagram of a central part of the polarization beam sprite prism in the projector in FIG. 6.

The beam from the third illumination lens 48 is concentrated to a central part as shown in FIG. 8. Eventually, two polarization planes 68 forming a triangular section are formed at a center part of the polarization beam sprite array 50 as shown in FIG. 9.

The beam converted into the S wave at the polarization beam sprite array 50 is directed to the color selecting plate 60 by the first illumination lens 52. The color selecting plate 60 converts a red beam in the color beam into a P wave polarization beam. To do this, as the color selecting plate 60, a red color selecting plate 60 is selected for converting a red color beam into the P wave polarization beam.

For an example, if a yellow (R+G) color beam is received from the first illumination lens 52, the color selecting plate 60 converts the red polarization beam in the yellow beam into the P wave. In this instance, a green polarization beam in the yellow beam is not converted, but forwarded as the S wave.

If a magenta (R+B) color beam is received from the first illumination lens 52, the color selecting plate 60 converts the red polarization beam in the magenta color beam (R+B) into the P wave. In this instance, a blue polarization beam in the magenta color beam is not converted, but forwarded as the S wave.

The beam from the color selecting plate 60 is directed to the polarization beam sprite prism 54. The polarization beam sprite prism 54 supplies a red color beam among the beam from the color selecting plate 60 to the first display 56, and color beams other than the red color beam is supplied to the second display 57. To do this, the split planes 55 transmit the P wave and reflect the S wave.

The first display 56 reflects a P wave red color beam according to a red video signal, to produce a picture beam with picture information. In this instance, the P wave beam reflected at the first display is converted into the S wave. The picture beam converted into the S wave at the first display 56 is reflected at the split plane 55, and directed to the projection lens 58.

The second display 56 reflects the S wave of green or blue beam according to a green or blue video signal, to produce a picture beam with picture information. In this instance, the S wave beam reflected at the second display 56 is converted into the P wave. The picture beam converted into the P wave at the second display 56 transmits the split planes 55, and is directed to projection lens 58. The projection lens 58 enlarges the picture beam from the polarization beam sprite prism 54, and projects onto a screen at a distance.

Figure 10:
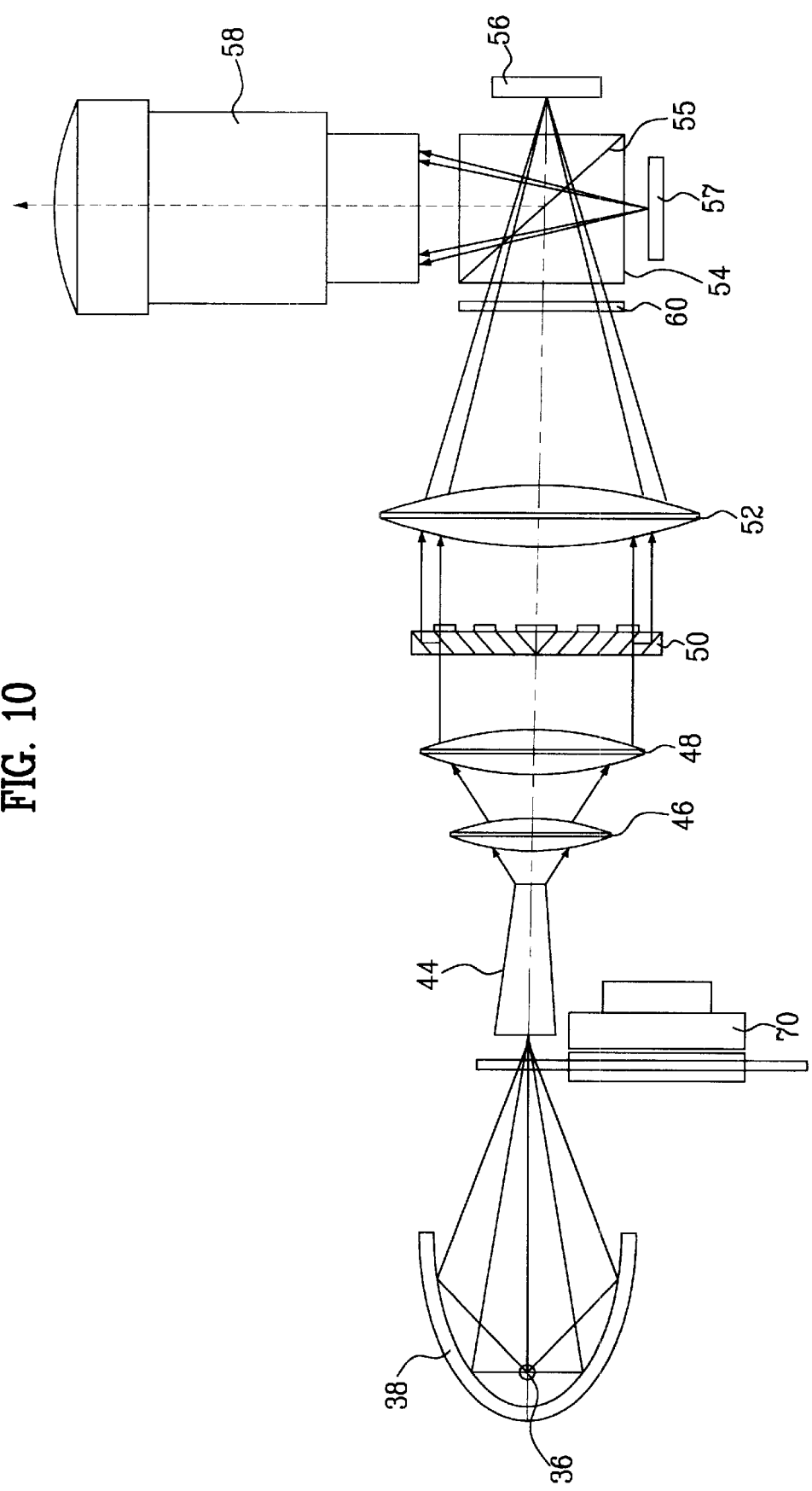
FIG. 10 illustrates a diagram of a projector in accordance with a second preferred embodiment of the present invention.

FIG. 10 illustrates a diagram of a projector in accordance with a second preferred embodiment of the present invention.

In the projector in accordance with a second preferred embodiment of the present invention, instead of the cylindrical color wheel in FIG. 6, a disk type color wheel 70 as shown in FIG. 10 may be used. The disk type color wheel 70 transmits yellow (R+G), and magenta (R+B) color beams in succession.

Figure 11:
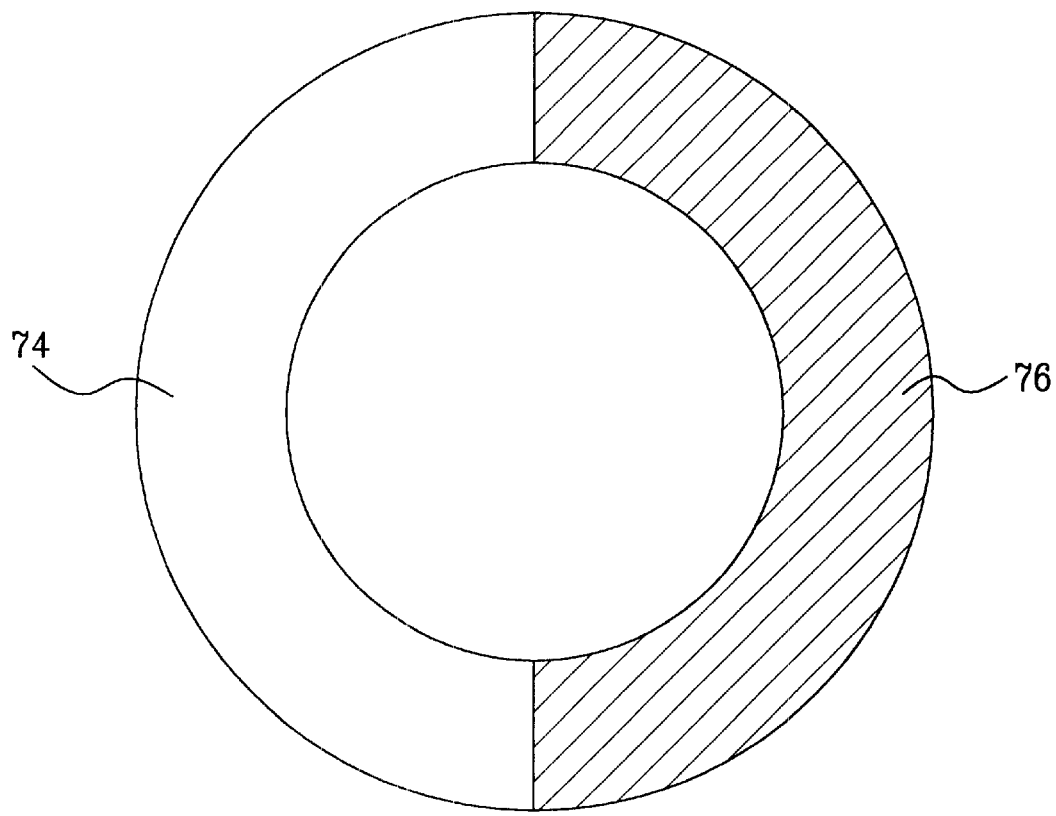
FIG. 11 illustrates a diagram of a disk color wheel in the projector in FIG. 10.

To do this, referring to FIG. 11, the disk type color wheel 70 includes a yellow color filter 74 and a red color filter 76. The yellow color filter 74 transmits only yellow color among an incident beam while being rotated by a driving force from the motor 72. The magenta color filter 76 transmits only magenta color among an incident beam while being rotated by a driving force from the motor 72. The other operation will be omitted as the operation is identical to the first embodiment.

Figure 12:
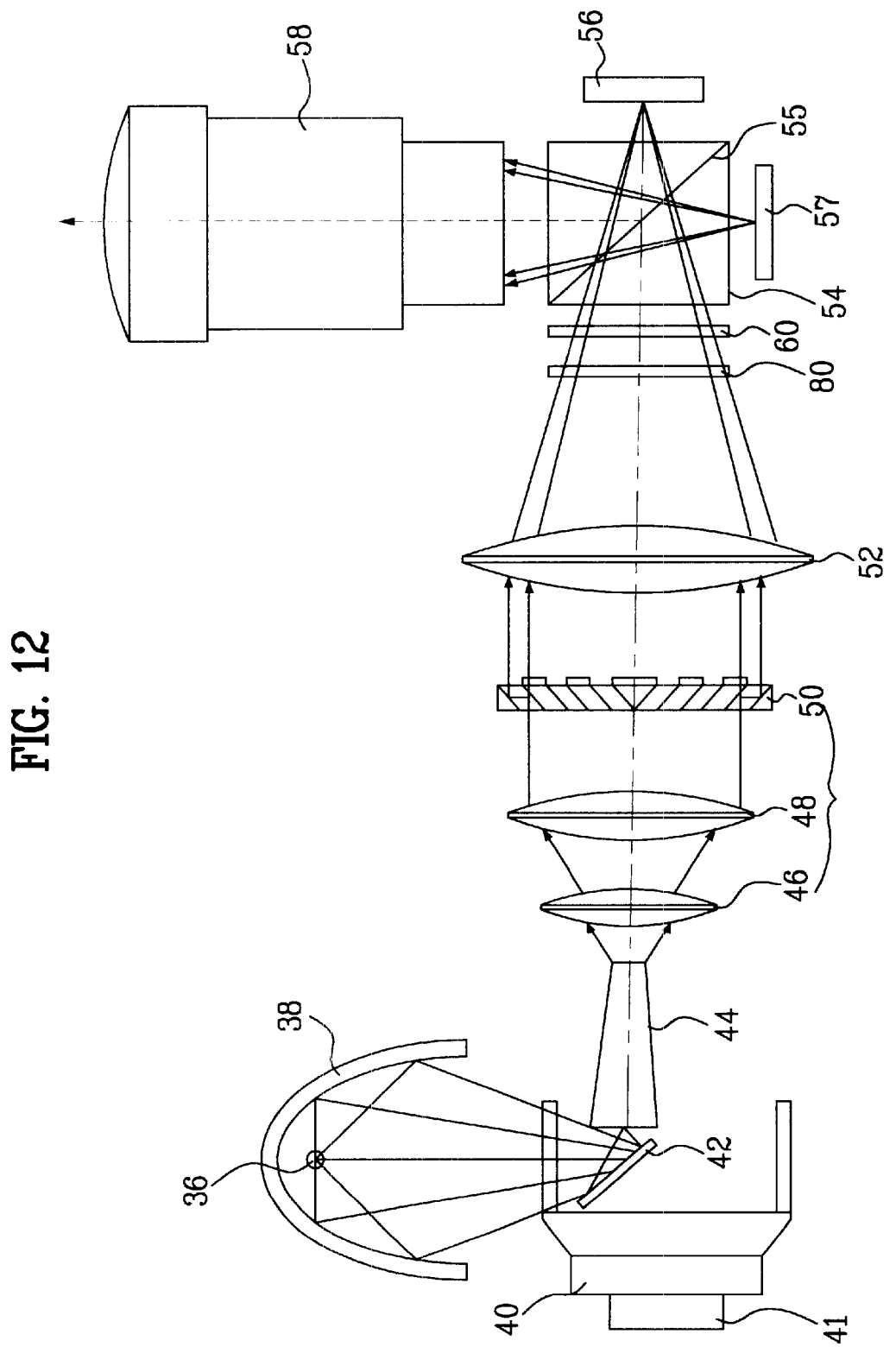
FIG. 12 illustrates a diagram of a projector in accordance with a third preferred embodiment of the present invention; and, FIG. 13 illustrates a diagram of a projector in accordance with a fourth preferred embodiment of the present invention.

FIG. 12 illustrates a diagram of a projector in accordance with a third preferred embodiment of the present invention.

Referring to FIG. 12, the projector in accordance with a third preferred embodiment of the present invention includes a polarization plate 80 between the color selecting plate 60 and the illumination lens 52. The polarization plate 80 transmits only a particular polarization beam among the beam from the first illumination lens 52. That is, the polarization plate 80 removes noise beams which are not converted into polarization beams at an illumination system. The removal of the noise beams at the polarization plate 80 improves contrast of the projector.

Figure 13:
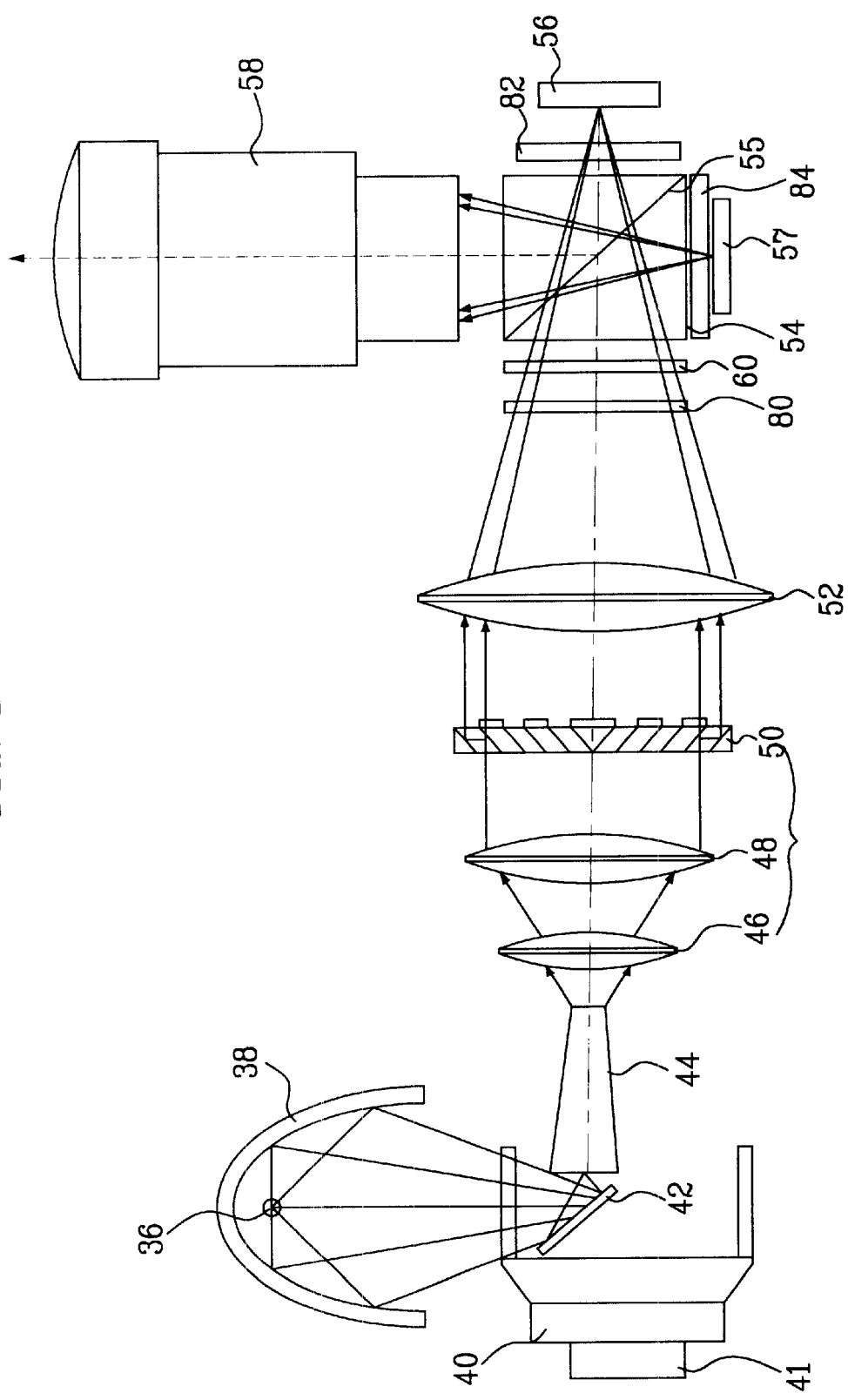

FIG. 13 illustrates a diagram of a projector in accordance with a fourth preferred embodiment of the present invention.

Referring to FIG. 13, the projector in accordance with a fourth preferred embodiment of the present invention includes a ¼ wave plate 82 between the polarization beam sprite prism 54 and the first display 56, and a ¼ wave plate 84 between the polarization beam sprite prism 54 and the second display 57. Accordingly, distortion of polarization beam components directed to the first display 56 and the second display 57 from the polarization beam sprite prism 54 is prevented, to improve a contrast.

As it is required to converge the beam to the rod lens in the embodiments of the present invention, a lamp with an elliptic reflector may be used. According to this, the projector of the present invention has an optical efficiency higher than the related art projector, and is made thinner than the related art projector.

The supplement of the lack of light quantity by providing two displays improves a color purity because a red light quantity, which lacks in the related art projector, can be increased. An optical loss can be minimized since only illumination lenses are employed, without the lens array. The split of only two colors at the color wheel improves an optical efficiency.

It will be apparent to those skilled in the art that various modifications and variations can be made in the projector of the present invention without departing from the spirit or scope of the invention. Thus, it is intended that the present invention cover the modifications and variations of this invention provided they come within the scope of the appended claims and their equivalents.

What is claimed is:

1. A projector comprising:
    a light source for emitting a beam of light;
    a color wheel for splitting two, or more than two color beams from the beam of light;
    a rod lens for making a distribution of the color beam from the color wheel uniform;
    a polarization beam converter for converting the color beam from the rod lens into a particular polarization beam;
    an optical part for focusing the color beam converted into the particular polarization beam;
    a color selecting plate for receiving the color beam from the optical part and converting a particular polarization color beam in the color beam;
    a polarization beam sprite prism for forwarding a particular color beam having polarization converted at the color selecting plate, and color beams of other colors through different paths;
    a first display for reflecting the particular color beam from the polarization beam sprite prism according to a video signal, to produce a picture beam;
    a second display for reflecting the color beams of other colors than the particular color beam from the polarization beam sprite prism according to a video signal, to produce a picture beam; and,
    a projection lens for enlarging, and projecting the picture beams.

2. A projector as claimed in claim 1, wherein the color wheel is a cylindrical color wheel.

3. A projector as claimed in claim 2, wherein the cylindrical color wheel includes a yellow color filter and a magenta color filter integrated thereto in a cylindrical form.

4. A projector as claimed in claim 1, wherein the color wheel is a disk type color wheel.

5. A projector as claimed in claim 4, wherein the disk type color wheel includes a yellow color filter and a magenta color filter integrated thereto in a disk form.

6. A projector as claimed in claim 1, wherein the color selecting plate converts a red color polarization beam including yellow color and magenta color.

7. A projector as claimed in claim 1, wherein the first display is provided with a red video signal, and the second display is provided with a green video signal and a blue video signal in succession.

8. A projector as claimed in claim 1, wherein the rod lens has an area of an optical input surface equal to, or larger than an area of an optical output surface.

9. A projector as claimed in claim 1, wherein the picture beams from the first display and the second display are supplied to the projection lens by the polarization beam sprite prism.

10. A projector as claimed in claim 1, further comprising:
    an elliptic reflector for reflecting the beam of light to forward of a lamp; and,
    a mirror for deflecting a path of the color beam passed through the cylindrical color wheel toward the rod lens.

11. A projector as claimed in claim 1, wherein the polarization beam converter includes;
    a second illumination lens, and a third illumination lens for focusing the beam from the rod lens at a particular location, and
    a polarization beam sprite array facing an optical output surface of the third illumination lens for converting the beam from the third illumination lens to a particular polarization beam.

12. A projector as claimed in claim 11, wherein the polarization beam sprite array converts polarization of the beam including the P wave and the S wave into the S wave.

13. A projector as claimed in claim 11, wherein the polarization beam sprite array has two polarization beam split planes in a center part to form a triangular section to concentrate the beam from the third illumination lens on the center part.

14. A projector as claimed in claim 1, wherein the polarization beam sprite prism has split planes for forwarding the particular color beam having polarization converted at the color selecting plate and the color beams of other colors through different paths.

15. A projector comprising:
    a light source for emitting a beam of light;
    a color wheel for splitting two, or more than two color beams from the beam of light;
    a rod lens for making a distribution of the color beam from the color wheel uniform;

a polarization beam converter for converting the color beam from the rod lens into a particular polarization beam;

an optical part for focusing the color beam converted into the particular polarization beam;

a color selecting plate for receiving the color beam from the optical part and converting a particular polarization color beam in the color beam;

a polarization plate between the optical part and the color selecting plate for removing noise beams;

a polarization beam sprite prism for forwarding a particular color beam having polarization converted at the color selecting plate, and color beams of other colors through different paths;

a first display for reflecting the particular color beam from the polarization beam sprite prism according to a video signal, to produce a picture beam;

a second display for reflecting the color beams of other colors than the particular color beam from the polarization beam sprite prism according to a video signal, to produce a picture beam; and, a projection lens for enlarging, and projecting the picture beams.

16. A projector as claimed in claim 15, wherein the color wheel is a cylindrical color wheel.

17. A projector as claimed in claim 16, wherein the cylindrical color wheel includes a yellow color filter and a magenta color filter integrated thereto in a cylindrical form.

18. A projector as claimed in claim 15, wherein the color wheel is a disk type color wheel.

19. A projector as claimed in claim 18, wherein the disk type color wheel includes a yellow color filter and a magenta color filter integrated thereto in a disk form.

20. A projector as claimed in claim 15, wherein the color selecting plate converts a red color polarization beam including yellow color and magenta color.

21. A projector as claimed in claim 15, wherein the first display is provided with a red video signal, and the second display is provided with a green video signal and a blue video signal in succession.

22. A projector as claimed in claim 15, wherein the rod lens has an area of an optical input surface equal to, or larger than an area of an optical output surface.

23. A projector as claimed in claim 15, wherein the picture beams from the first display and the second display are supplied to the projection lens by the polarization beam sprite prism.

24. A projector comprising:

a light source for emitting a beam of light;

a color wheel for splitting two, or more than two color beams from the beam of light;

a rod lens for making a distribution of the color beam from the color wheel uniform;

a polarization beam converter for converting the color beam from the rod lens into a particular polarization beam;

an optical part for focusing the color beam converted into the particular polarization beam;

a color selecting plate for receiving the color beam from the optical part and converting a particular polarization color beam in the color beam;

a polarization beam sprite prism for forwarding a particular color beam having polarization converted at the color selecting plate, and color beams of other colors through different paths;

a first display for reflecting the particular color beam from the polarization beam sprite prism according to a video signal, to produce a picture beam;

a second display for reflecting the color beams of other colors than the particular color beam from the polarization beam sprite prism according to a video signal, to produce a picture beam;

a first ¼ wave plate between the polarization beam sprite prism and the first display for preventing distortion of a polarization beam component supplied from the polarization beam sprite prism to the first display;

a second ¼ wave plate between the polarization beam sprite prism and the second display for preventing distortion of a polarization beam component supplied from the polarization beam sprite prism to the second display; and, a projection lens for enlarging, and projecting the picture beams.

25. A projector as claimed in claim 24, wherein the picture beams from the first display and the second display are supplied to the projection lens by the polarization beam sprite prism.

26. A projector as claimed in claim 24, wherein the rod lens has an area of an optical input surface equal to, or larger than an area of an optical output surface.

27. A projector as claimed in claim 24, wherein the color wheel is a cylindrical color wheel.

28. A projector as claimed in claim 27, wherein the cylindrical color wheel includes a yellow color filter and a magenta color filter integrated thereto in a cylindrical form.

29. A projector as claimed in claim 24, wherein the color wheel is a disk type color wheel.

30. A projector as claimed in claim 29, wherein the disk type color wheel includes a yellow color filter and a magenta color filter integrated thereto in a disk form.

31. A projector as claimed in claim 24, wherein the color selecting plate converts a red color polarization beam including yellow color and magenta color.

32. A projector as claimed in claim 24, wherein the first display is provided with a red video signal, and the second display is provided with a green video signal and a blue video signal in succession.

* * * * *